(No Model.)
W. J. HEATH.
LEMON SQUEEZER.
No. 590,221. Patented Sept. 21, 1897.
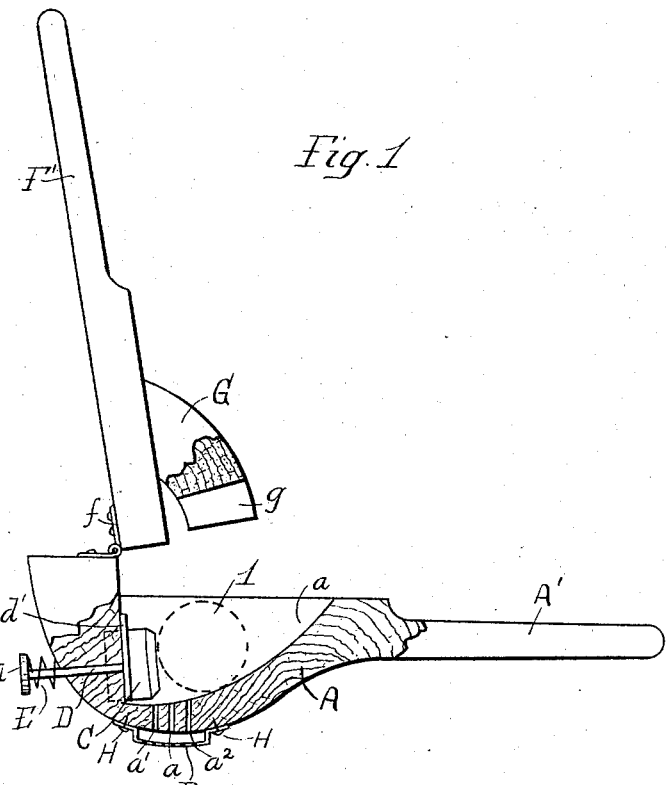
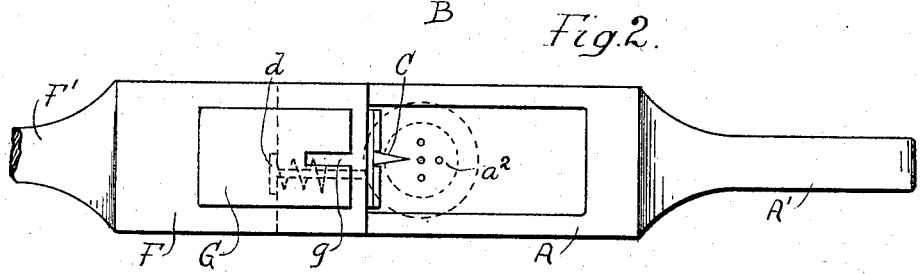
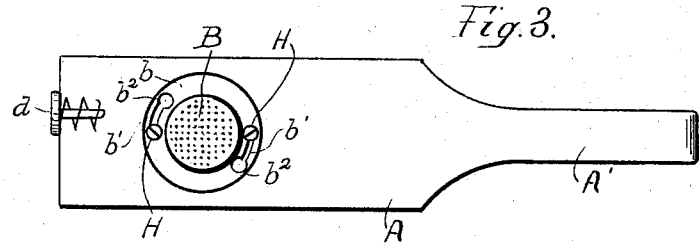
WITNESSES:
P. McComb.
E. Seidler.
INVENTOR
William J. Heath.
BY
ATTORNEYS

UNITED STATES PATENT OFFICE.

WILLIAM JUDD HEATH, OF KINGSTON, JAMAICA.

LEMON-SQUEEZER.

SPECIFICATION forming part of Letters Patent No. 590,221, dated September 21, 1897.

Application filed February 4, 1897. Serial No. 622,030. (No model.)

*To all whom it may concern:*

Be it known that I, WILLIAM JUDD HEATH, a subject of the Queen of Great Britain, and a resident of Kingston, Jamaica, have invented certain new and useful Improvements in Lemon-Squeezers, of which the following is a specification, reference being had to the accompanying drawings, forming a part thereof, in which similar letters of reference indicate corresponding parts.

This invention relates to improvements in lemon-squeezers, the object thereof being to supply an article of this character which will cut a lemon into halves and squeeze the juice therefrom by one stroke of a plunger, whereby the labor of extracting the juice from lemons is considerably facilitated.

The invention will be hereinafter fully described, and specifically set forth in the annexed claims.

In the accompanying drawings, forming part of this specification, Figure 1 is a side elevation of my improved lemon-squeezer, showing the same partly broken away in cross-section and illustrating the device in a half-open condition. Fig. 2 is a plan view of the device, showing the same wholly open; and Fig. 3 is an inverted plan view of the device.

In the practice of my invention I provide a bowl A, having a recess $a$ therein which is segmental in cross-section and has an approximately upright wall $a'$ at the rear thereof. Passing through the bottom of the bowl A are a series of apertures $a^2$, adapted for discharging the juice of the fruit being squeezed, and placed over the said apertures at the lower outer surface of the bowl is a removable screen B, which has a flange $b$ thereon. This flange has two segmental slots $b'$ therein which terminate in enlarged openings $b^2$, through which the heads or screws H may pass for removing the screen. Connected to the wall $a'$ is a knife C and normally resting against the wall $a'$ is a plate $c$, which has a slot $c'$ therein surrounding the said knife. Connected to this said plate and extended rearwardly through the walls $a'$ is a rod D, which has a head $d$ upon the outer end thereof. Located between this said head and the outer surface of the wall $a'$ is a spiral spring E, which is normally expanded for the purpose of keeping the plate $c$ in normal contact with the wall $a'$. The bowl A is further provided with a horizontally-extended handle A'.

The rear wall $a'$ of the bowl A extends upwardly beyond the horizontal line of the upper surface thereof and is connected to a swinging block F by means of a hinge $f$. This said block has a segmental plunger G connected to the under surface thereof, which plunger has a groove $g$ cut through the end thereof for receiving the knife C when the device is in a closed position. The block F is further supplied with a handle F', adapted for use in operating the device.

In the operation of the invention a lemon, as illustrated by dotted lines 1 in Fig. 1 of the drawings, is placed within the aperture $a$ against the knife C. The handles F' and A' are then pressed toward each other, whereby the plunger G will contact with the lemon and force the same in a rearward direction against the wall $a'$ and by one stroke the lemon will be cut in half and thoroughly squeezed until all of its juice is extracted, which juice will flow downwardly through the openings $a^2$ and then through the screen or strainer B into any suitable receptacle. To release the pressed fruit from contact with the wall $a'$, it is simply necessary to press the rod D inwardly through the medium of its head $d$ and invert the bowl A. The device is then ready for another lemon and the operation as described above can be continued indefinitely.

Having thus described my invention, what I claim as new, and desire to secure by Letters Patent, is—

1. The combination of a bowl having a recess therein of segmental contour, and a series of apertures leading therefrom for discharging the juice of fruit, a stationary knife located within the said recess, a spring-actuated slotted plate in the rear of said knife, and a block hinged to the said bowl having a grooved plunger thereon for squeezing the fruit, said block and said bowl being supplied respectively with handles for operating the device, said handles having reduced outer portions, substantially as shown and described.

2. As a fruit-squeezer, the combination of a bowl having a recess therein, of a segmental contour, the said bowl having a series of perforations leading through the bottom thereof and communicating with the said aperture, and a removable screen depending from the bottom of the bowl under the perforations, and a stationary knife located within the said recess, and a spring-actuated plate for removing pulp, and a block hinged to the said bowl having a plunger thereon for squeezing the fruit, said block and bowl being supplied respectively with handles for operating the device, substantially as shown and described.

In testimony that I claim the foregoing as my invention I have signed my name, in presence of two witnesses, this 25th day of January, 1897.

WILLIAM JUDD HEATH.

Witnesses:
PHEWRECHARLIS CUNHS,
CHARLES GOLDIE CLINTON KERR.